US006348089B1

(12) United States Patent
Marx et al.

(10) Patent No.: US 6,348,089 B1
(45) Date of Patent: Feb. 19, 2002

(54) COMPOSITIONS AND PROCESS FOR THE PROTECTIVE TREATMENT OF WOOD

(75) Inventors: Hans-Norbert Marx, Bühl-Vimbuch; Tilo Vogel; Oliver Arlt, both of Frauenhain; Florian Lichtenberg, Grenzach-Wyhlen, all of (DE)

(73) Assignees: Lonza AG, Basel (CH); Impragnierwerk Wulknitz GmbH, Wulknitz (DE)

(*) Notice: Subject to any disclaimer, the term of this patent is extended or adjusted under 35 U.S.C. 154(b) by 0 days.

(21) Appl. No.: 09/680,862

(22) Filed: Oct. 6, 2000

Related U.S. Application Data

(63) Continuation of application No. PCT/CH99/00288, filed on Jul. 2, 1999.

(60) Provisional application No. 60/158,999, filed on Oct. 7, 1999.

(30) Foreign Application Priority Data

Jul. 12, 1998 (DE) ........................................ 198 31 036
Jun. 12, 1999 (DE) ........................................ 199 26 884

(51) Int. Cl.[7] .......................... B27K 3/44; A01N 65/00

(52) U.S. Cl. ............................... 106/18.32; 106/18.33; 106/284; 427/298; 514/642; 514/643

(58) Field of Search .......................... 106/18.32, 18.33, 106/284; 427/298; 514/642, 643

(56) References Cited

U.S. PATENT DOCUMENTS 4,718,943 A * 1/1988 Alscher et al. .......... 106/15.05
5,098,472 A * 3/1992 Watkins et al. .......... 106/15.05
5,223,524 A * 6/1993 Valcke ........................ 514/383
5,397,795 A * 3/1995 Valcke ........................ 514/383

FOREIGN PATENT DOCUMENTS

| | | | | |
|---|---|---|---|---|
| DE | 3811199 | * | 10/1989 | |
| DE | 3811199 | A1 | 10/1989 | B27K/3/46 |
| EP | 227 340 | A1 | 7/1987 | B27K/3/44 |
| EP | 227430 | * | 7/1987 | |
| EP | 393 746 | A1 | 10/1990 | |
| EP | 515 899 | A2 | 12/1992 | C08L/61/20 |
| JP | 56-72902 | * | 6/1981 | B27K/3/50 |

* cited by examiner

*Primary Examiner*—Anthony Green
(74) *Attorney, Agent, or Firm*—Darby & Darby

(57) ABSTRACT

Compositions for the protective treatment of wood against rot and attack by insects which comprise at least the following components:

a) 10–90 parts of coal-tar oil b) 2–20 parts of a biocidally active quaternary ammonium compound c) 10–90 parts of water. are described. The compositions according to the invention are easily preparable stable emulsions which are distinguished, inter alia, by good penetrability, strongly reduced odour of the treated woods, absence of annoying tar oil enrichments at the surface and strongly reduced "bleeding" of the treated wood at hot temperatures, considerably enhanced activity in spite of a lower coal-tar oil content and reduced toxicity compared to pure coal-tar oil.

10 Claims, No Drawings

COMPOSITIONS AND PROCESS FOR THE PROTECTIVE TREATMENT OF WOOD

This is a continuation of International Application No. PCT/CH99/00288, filed Jul. 2, 1999, and claims the benefit under 35 U.S.C. §119 of U.S. Ser. No. 60/158,999, filed Oct. 7, 1999, the entire disclosures of which are incorporated herein by reference.

FIELD OF THE INVENTION

The present invention relates to compositions based on coal-tar oil for the protective treatment of wood. It furthermore relates to a process for the protective treatment of wood using the compositions according to the invention.

BACKGROUND OF THE INVENTION

The use of coal-tar oil for protecting wood against rot and attack by insects has been known since the middle of the 19th century and is still customarily employed for preserving masts, fences, beams etc. Even early on, attempts were made to use coal-tar oil in the form of emulsions in water or aqueous protective salt solutions (zinc salts, copper salts). However, these use forms did not give the desired results, and most tar oils were still used undiluted. In addition, attempts were made to improve the unsatisfactory stability of coal-tar oil emulsions by "homogenization" (analogously to the process used for milk) or by treatment with specifically adapted dispersing apparatus (for example ULTRA-TURRAX®) and diverse additives (AT-PS-86,925, EP-A-0 227 430). These processes involve expensive equipment and consume a lot of energy. More recently, the application of coal-tar oil emulsions in water attracted renewed interest, in particular since in this manner it is possible to partially eliminate or reduce some disadvantages of the undiluted coal-tar oil, such as, for example, the unpleasant odour, the tendency to sweat and the sticky surface of the treated woods (U.S. Pat. No. 5,098,472).

This known process has the disadvantage that the emulsions are relatively unstable and that, owing to the emulsion, the effective proportion of coal-tar is reduced by the proportion of water and the emulsifier(s), so that the amount that is applied has to be increased to ensure effective and long-lasting protection.

OBJECT OF THE INVENTION

Accordingly, it was an object of the present invention to eliminate or reduce the disadvantages of the known preparation processes and applications of tar oil emulsions.

According to the invention, this object is achieved by the compositions described below and pressure treating wood with a composition of the present invention.

SUMMARY OF THE INVENTION

Surprisingly, it has been found that, by using biocidally active quaternary ammonium compounds, if appropriate together with polar solvents, such as, for example, glycol derivatives, it is possible to prepare stable emulsions and microemulsions of coal-tar oil in water by simple stirring without any special equipment requirements. Not only does the biocidal action of the quaternary ammonium compounds compensate for the fact that the tar oil is diluted, but it has additionally been found—contrary to expectations—that the depth of penetration and the activity spectrum considerably exceeds those of the pure undiluted tar oil.

The compositions according to the invention comprise at least the following components:

a) 5–90 parts, preferably 10–90 parts, of coal-tar oil b) 2–20 parts of a biocidally active quaternary ammonium compound c) 10–90 parts of water.

Here and below, all amounts are stated in parts by mass.

Suitable biocidally active quaternary ammonium compounds are, for example:

N—$C_{8-20}$-alkyl-N,N-dimethyl-N-benzylammonium chloride, bromide or iodide*)

N,N-di-$C_{6-20}$-alkyl-N,N-dimethylammonium chloride, bromide or iodide*)

N—$C_{6-20}$-alkyl salts*) of pyridine, quinoline, etc.

N—$C_{6-20}$-alkyl-N,N,N-trimethylammonium chloride, bromide or iodide*)

N,N-di-$C_{6-20}$-alkyl-N-methyl-N-poly(ethoxy)ammonium salts*)

*) Instead of the halides, it is also possible for the salts of other inorganic acids or organic carboxylic acids to be present, for example acetate, propionate, sulphate, etc.

It has been found, for example, that an emulsion comprising only 30% of tar oil, about 10% of a cationic ammonium compound, about 5% of auxiliary and 55% of water was at least twice as effective against wood-destroying fungi as undiluted pure coal-tar oil.

With the aid of these compositions, it is possible to utilize the excellent activity of coal-tar oil, supported by long-term experience, and at the same time to reduce considerably the disadvantages of odour, of sweating at high ambient temperatures, of elutability and of the oily sticky surface of the wood.

Simultaneously, better, i.e. more uniform and deeper, distribution of the protective composition in the wood is achieved and—this appears to be particularly advantageous—the wood can have a higher moisture content than would be possible if pure tar oil was used. Thus, the time and energy for drying the raw wood, for example beams and masts, can be reduced considerably.

DETAILED DESCRIPTION OF THE INVENTION

A further advantage of the compositions according to the invention consists in the fact that they can be processed at normal ambient temperatures, in contrast to pure tar oil. That is to say that pure tar oil, owing to its viscosity and flow behaviour, can only be processed at temperatures of about 100° C., which is associated with a high energy input. Moreover, this property of tar oil stands in the way of deep penetration and optimum distribution in the wood.

The intense odour of coal-tar oil is caused, in particular, by bi- and tricyclic aromatic compounds, for example naphthalene and alkylnaphthalenes. Only some of these can be removed by distillation since, if they are removed completely, a tar oil is formed which has a viscosity which is too high and not even manageable at 100–120° C. Because of the way in which they are prepared, the compositions according to the invention permit the use even of tar oils of relatively high viscosity which, accordingly, are highly deodorized, which facilitates the use of coal-tar oil even in sensitive areas, for example beams for underground rails, or makes this use possible in the first place.

Preferably, the compositions according to the invention additionally comprise up to 20 parts of a polyglycol compound to improve (storage) stability. These include, for example, polyethylene glycols and polypropylene glycols, and their alkyl and aryl ethers and esters.

Particular preference is given to polyethylene glycol compounds such as, for example, polyethylene glycol, to ethoxylated phenols and to diethylene glycol monobutyl ethers.

In addition to the formulation components already mentioned, the compositions according to the invention may comprise, for example, the following substances:

resins, binders, polymers waxes dyes pigments antioxidants odour-masking substances markers (tracers)

They preferably comprise one or more components from the group of the resins, binders, waxes, dyes and pigments.

Particularly preferred binders are alkyd resins and similar resins based on natural oils, such as linseed oil or soya oil, in particular those which are water-soluble or water-dilutable owing to reaction with ethylene oxide or propylene oxide.

To widen the activity spectrum, the compositions according to the invention preferably additionally comprise an effective amount of one or more insecticides, fungicides, algicides or bacteriocides.

They may comprise, for example, one or more of the following active compounds:

Amphoteric surfactants having biocidal action

Methyl benzimidazol-2-ylcarbamate 1,2-Benzisothiazol-3-one

Biguanides having biocidal action

Organic and inorganic boron compounds

α-tert-Butyl-α-(p-chlorophenethyl)-1H-1,2,4-triazol-1-ethanol 2-sec-Butylphenyl N-methylcarbamate (±)-cis-4-[3-(tert-Butylphenyl)-2-methylpropyl]-2,6-dimethylmorpholine 5-Chloro-2-methyl-4-isothiazolin-3-one 2-(4-Chlorophenyl)-3-cyclopropyl-1-(1H-1,2,4-triazol-1-yl)butan-2-ol 1-(6-Chloro-3-pyridinyl)methyl-4,5-dihydro-N-nitro-1H-imidazol-2-amine Chlorohexidine and its salts Chlorinated phenols, for example tetra- and pentachlorophenol Chloronitrobenzene derivatives 1-[4-(2-Chloro-α,α,α-trifluoro-p-tolyloxy)-2-fluorophenyl]-3-(2,6-difluorobenzoyl)urea 1-(4-Chlorophenyl)-3-(2,6-difluorobenzoyl)urea α-[2-(4-Chlorophenyl)ethyl]-α-(1,1-dimethylethyl)-1H-1,2,4-triazol-1-ethanol Cyano(4-fluoro-3-phenoxyphenyl)methyl 3-(2,2-dichloroethenyl)-2,2-dimethylcyclopropanecarboxylate (RS)-α-Cyano-3-phenoxybenzyl-(RS)-2-(4-chlorophenyl)-3-methylbutyrate α-Cyano-3-phenoxybenzyl isopropyl-2,4-dichlorophenylacetate N-Cyclohexyl-N-methoxy-2,5-dimethylfuran-3-carboxamide Di(guanidinooctyl)amine 3-(2,2-Dibromovinyl-2,2-dimethyl)-α-(cyano-m-phenoxy-benzyl-1R,3R)cyclopropanecarboxylate 1-[2-(2,4-Dichlorophenyl)-1,3-dioxolan-2-ylmethyl]-1H-1,2,4-triazole 1-[2-(2,4-Dichlorophenyl)-4-propyl-1,3-dioxolan-2-yl-methyl]-1H-1,2,4-triazole 3-Phenoxybenzyl (+)-3-(2,2-dichlorovinyl-2,2-dimethyl)-cyclopropane-1-carboxylate α-Cyano-3,3-phenoxybenzyl 3-(2,2-dichlorovinyl-2,2-dimethyl)cyclopropane-1-carboxylate O,O-Diethyl-O-(α-cyanobenzylideneamino) thiophosphate O,O-Diethyl-O-3,5,6-trichloro-2-pyridyl thionophosphate O,O-Diethyldithiophosphoryl-6-chlorobenzoxazolone 5,6-Dihydro-2-methyl-1,4-oxathiine-3-carboxanilide N,N-Dimethyl-N'-phenyl-(N'-fluoromethylthio) sulphamide N,N-Dimethyl-N'-tolyl-(N'-fluoromethylthio)sulphamide O,O-Dimethyl-S-(2-methylamino-2-oxoethyl) dithiophosphate O,O-Dimethyl-S-(N-phthalimido)methyl dithiophosphate 3,5-Dimethyltetrahydro-1,3,5-thiadiazin-2-thione Dimethylalkylamine salts Dithiocarbamates, metal and amine salts Ethyl 2-(4-phenoxyphenoxy)ethylcarbamate 2-(2-Furanyl)-1H-benzimidazole Halogenated acetic acids and their amides and esters 6,7,8,9,10-Hexachloro-1,5,5a,6,9,9a-hexahydro-6,9-methano-2,3,4-benzodioxothiepine 3-oxide Hexachlorocyclohexane 8-Hydroxyquinoline and its halogenated derivatives 2-Iodobenzanilide 3-Iodo-3-propinyl butylcarbamate Copper 8-oxyquinoline 1-Naphthyl N-methylcarbamate 2-Methyl-4-isothiazolin-3-one Methylene bisthiocyanate Nitroalkanols having biocidal action N-Nitroso-N-cyclohexylhydroxylamine and its salts N-Nitroso-N-phenylhydroxylamine and its salts Norbornene dimethanohexachlorocyclosulphite 2-N-Octyl-4-isothiazolin-3-one Organotin compounds, for example tributyltin oxide and tributyltin benzoate Phenylphenols 2-Isopropoxyphenyl N-methylcarbamate N-Propyl-N-[2-(2,4,6-trichlorophenoxy)ethyl]imidazole-1-carboxamide Pyridine-2-thiol 1-oxide and its salts Salicylanilide and its halogenated derivatives (4-Ethoxyphenyl)[3-(4-fluoro-3-phenoxyphenyl)propyl]-(dimethyl)silane N-(1,1,2,2-Tetrachloroethylthio)-3,6,7,8-tetrahydrophthalimide Tetrachloroisophthalonitrile 2-(Thiazol-4-yl)benzimidazole 2-Thiocyanomethylthiobenzothiazole 1-(1,2,4-Triazol-1-yl)-1-(4-chlorophenoxy)-3,3-dimethylbutan-2-ol 1-(1,2,4-Triazol-1-yl)-1-(4-chlorophenoxy)-3,3-dimethylbutan-2-one N-Trichloromethylthio-3,6,7,8-tetrahydrophthalimide N-Trichloromethylthiophthalimide N-Tridecyl-2,6-dimethylmorpholine By addition of binders such as, for example, drying alkyd resins, acrylates or other polymers, it is possible to improve the surfaces of the treated woods mechanically and optically, and at the same time to reduce the mobility (leaching and bleeding) of the coal-tar oil even further. The systems according to the invention can furthermore, in contrast to coal-tar oil on its own, be modified by addition of dyes or pigments, such that it is possible to stain the woods treated. By addition of waxes, it is possible to achieve matting of the surfaces of the woods treated, in combination with a strong water-repelling effect which reduces the uptake of liquid water without obstructing moisture exchange via the vapour phase.

The preparations according to the invention are prepared, for example, as follows:

(I) 5–90 parts of coal-tar oil, for example WEI type C, are initially charged and, if appropriate at slightly elevated temperature (about 50° C.), admixed with (II) 2–20 parts of cationic surfactant, for example N,N-didecyl-N-methyl-N-poly-(ethoxy)ammonium propionate, and the mixture is stirred until homogeneity is achieved;

(III) 0–20 parts of glycol derivative, for example diethylene glycol monobutyl ether, are then added and the mixture is stirred until homogeneity is achieved, (IV) 0–20 parts of stabilizer/solubilizer, for example p-nonylphenol ethoxylate (EO=10–14), are then added and the mixture is once more stirred until homogeneity is achieved, and the batch is cooled. After cooling, (V) 10–90 parts of water are added and the mixture is stirred until a homogeneous emulsion has formed.

In this preparation process, stable, milky (opaque) or clear low-viscosity mixtures are-formed which can be introduced with good penetration into the wood using the boiler pressure method (use of reduced pressure and superatmospheric pressure), without raising the temperature. Depending on the proportion of the formulation components I, II and V, the total amount that has to be introduced for a comprehensive protection of the wood is 20–80 kg/$m^3$ of wood.

The compositions according to the invention are preferably applied in vacuum boiler pressure units such that the compositions are introduced into the wood to be protected using differences in pressure. The process steps include a pre-vacuum phase, a flood phase during which the vacuum is maintained, and a pressure phase. If appropriate, the process is concluded by applying a final vacuum. The amount of the protective composition introduced is controlled by weighing. In the case of woods or wood species which soak easily, it is possible to increase the water content in the compositions even more, compared with the examples.

The impregnation is preferably carried out without heat input, i.e. approximately at ambient temperature.

If required, the water which is introduced into the wood together with the compositions can be removed by treatment with heat. If the preparations additionally comprise polymers which are curable at elevated temperatures, it is possible to treat the wood with hot steam. This steam treatment then results in a rediffusion and more even distribution of the compositions, combined with a more effective fixing. Polyethylene glycols, which are an optional constituent of the preparations, impart dimension-stabilizing properties to the preparations, combined with a significantly reduced tendency of the wood thus treated to crack.

Altogether, the compositions according to the invention have the following advantages compared with coal-tar oil:

1. high stability of the emulsions,
2. use at normal ambient temperature is possible,
3. good distribution of the protective composition even in woods with an average moisture content,
4. strongly reduced odour of the woods treated,
5. no annoying tar oil enrichments on the treated wood,
6. strongly reduced “bleeding” of the treated wood at hot temperatures,
7. the surface structure and the grain remain visible,
8. only slight discoloration of the surface,
9. compatibility with customary varnishes and clearcoats,
10. considerably enhanced activity in spite of a lower content of coal-tar oil in the preparations,
11. option to stain the treated woods,
12. less leaching of the treated woods, and consequently no relevant local environmental stress,
13. low toxicity compared with pure coal-tar oil,
14. less cracking when drying the treated wood,
15. option of using strongly deodorized, highly viscous tar oils.

The examples below illustrate the composition and the effect of the compositions according to the invention and the practice of the process according to the invention.

COMPARATIVE EXAMPLE 1

(not according to the invention)

100 parts of coal-tar oil, undiluted use at 110° C.

COMPARATIVE EXAMPLE 2

(not according to the invention)

50 parts of coal-tar oil 10 parts of anionic emulsifier 40 parts of water

EXAMPLE 1

40 parts of coal-tar oil 8 parts of N-cocosalkyl-N,N-dimethyl-N-benzylammonium acetate 4 parts of nonylphenol ethoxylate(8–12 EO groups)

10 parts of diethylene glycol monobutyl ether 38 parts of water

EXAMPLE 2

30 parts of coal-tar oil 10 parts of N,N-didecyl-N-methyl-N-poly(ethoxy) ammonium lactate 4 parts of nonylphenol ethoxylate (about 14 EO groups)

56 parts of water

EXAMPLE 3

50 parts of coal-tar oil 10 parts of N-cocosalkyl-N,N-dimethyl-N-benzylammonium chloride 10 parts of polyethylene glycol (MW about 300)

30 parts of water

EXAMPLE 4

30 parts of coal-tar oil 5 parts of N,N-didecyl-N-methyl-N-poly(ethoxy) ammonium chloride 20 parts of diethylene glycol monobutyl ether 45 parts of water The products characterized in Examples 1–4 and Comparative Examples 1–2 were applied to pine sapwood using pressure differences, and the biological effect was examined using a process modelled on DIN EN 113. The results are summarized in Table 1 below.

TABLE 1

Biological action against wood-destroying fungi[1)]

| Example No. | Tar oil content [%] | Relative activity[2)] [%] |
|---|---|---|
| C1 | 100 | 100 |
| C2 | 50 | <50 |
| 1 | 40 | 130 |
| 2 | 30 | 145 |
| 3 | 50 | 165 |
| 4 | 30 | 90 |

[1)]Evaluation was based on the limit values against 4 wood-destroying fungi after ageing (EN 73)
[2)]The biological action of coal-tar oil is taken to be 100%.

It is evident that the preparations according to the invention mentioned as Examples 1 to 4 have considerably increased activity owing to the addition of cationic compounds, in spite of the lower tar oil content.

As can be seen from Table 1, the activity increase in Examples 1 to 4 is from 1:3 to 1:5, based on the effective coal-tar oil contents.

EXAMPLE 5

40 parts of coal-tar oil 8 parts of N-cocosalkyl-N,N-dimethyl-N-benzylammonium acetate 4 parts of nonylphenol ethoxylate (8–12 EO groups)

10 parts of diethylene glycol monobutyl ether 8 parts of binder[*)]

30 parts of water

[*)] Water-dilutable alkyd resin, obtained by boiling down linoleic acid, pentaerythritol and polyethylene glycol (MW about 600)

EXAMPLE 6

30 parts of coal-tar oil 10 parts of N,N-didecyl-N-methyl-N-poly(ethoxy) ammonium lactate 4 parts of nonylphenol ethoxylate (about 14 EO groups)

6 parts of iron oxide paste) 20%

50 parts of water

[*)] Pigment paste, obtained by grinding transparent red iron oxide in polyethylene glycol (MW about 300)

EXAMPLE 7

50 parts of coal-tar oil 10 parts of N-cocosalkyl-N,N-dimethyl-N-benzylammonium chloride 10 parts of polyethylene glycol (MW about 300)

2 parts of wax[*)]

28 parts of water

[*)] Polyvinyl ether wax, pre-dissolved in hot coal-tar oil

EXAMPLE 8

30 parts of coal-tar oil 5 parts of N,N-didecyl-N-methyl-N-poly(ethoxy) ammonium chloride 20 parts of diethylene glycol monobutyl ether 1 part of 1-naphthyl N-methylcarbamate (Sevin)[*)]

44 parts of water

[*)] pre-dissolved in tar oil

EXAMPLE 9

A concentrate was prepared according to the following recipe:

60 parts of coal-tar oil, type B WEI 20 parts of N,N-didecyl-N-methyl-N-poly(ethoxy) ammonium propionate 20 parts of binder, prepared by heating 94 parts of linseed oil and 3 parts of maleic acid at 180° C., followed by esterification with 3 parts of polyethylene glycol (10 EO groups) at 195° C.

The resulting concentrate was diluted with water in the ratio 1:9 to give the ready-to-use emulsion.

EXAMPLE 10

A concentrate was prepared according to the following recipe:

65 parts of coal-tar oil, type B WEI 15 parts of N,N-didecyl-N-methyl-N-poly (ethoxy) ammonium propionate 15 parts of binder, prepared by heating 92 parts of soya oil and 3 parts of maleic acid at 180° C., followed by esterification with 5 parts of polypropylene glycol (12 PO groups) at 170° C.

1 part of silicone antifoam 1 part of propiconazole 3 parts of water

EXAMPLE 11

A concentrate was prepared according to the following recipe:

70 parts of coal-tar oil, type B WEI 10 parts of N,N-didecyl-N-methyl-N-poly(ethoxy) ammonium propionate 19 parts of binder, prepared by heating 85 parts of polybutadiene oil and 5 parts of maleic acid at 150° C., followed by esterification with 10 parts of polyethylene glycol (10 EO groups) at 150° C.

1 part of oil-soluble dye

The resulting concentrate was diluted with water in the ratio 1:9 to give the ready-to-use emulsion.

EXAMPLE 12

A concentrate was prepared according to the following recipe:

60 parts of coal-tar oil, type B WEI 10 parts of N,N-didecyl-N,N-dimethylammonium chloride, 80% in water 19 parts of binder, prepared by heating 80 parts of linseed oil and 12 parts of neopentyl glycol at 170° C., followed by reaction with 8 parts of ethylene oxide under elevated pressure 10 parts of diethylene glycol monobutyl ether The resulting concentrate was diluted with water in the ratio 1:9 to give the ready-to-use emulsion.

What is claimed is:

1. A liquid composition for the protective treatment of wood against rot and attack by insects, comprising at least the following components:

a) 5–90 parts by weight of coal-tar oil;

b) 2–20 parts by weight of a biocidally active quaternary ammonium compound; and c) 10–90 parts by weight of water.

2. A composition according to claim 1, further comprising up to 20 parts by weight of a polyethylene glycol compound to improve stability.

3. A composition according to claim 1, further comprising resins, binders, waxes, dyes and/or pigments.

4. A composition according to claim 1, wherein the binder comprises at least one alkyd resin or a resin based on natural oils.

5. A composition according to claim 4, wherein the natural oil is linseed oil or soya oil.

6. A composition according to claim 1, further comprising a biocidally effective amount of additional biocides.

7. A composition according to claim 6, wherein the additional biocide is at least one of an insecticide, fungicide, algicide, and bacteriocide.

8. A process for the protective treatment of wood comprising impregnating the wood with a composition according to claim 1.

9. A process according to claim 8, wherein the impregnation is carried out without heat input.

10. A process according to claim 8, wherein the impregnating step comprises pressure treating the wood with the composition.

* * * * *